No. 694,087. Patented Feb. 25, 1902.
D. R. BOWEN & C. T. ERICSSON.
APPARATUS FOR STRETCHING AND VULCANIZING A PLURALITY OF RUBBER BELTS.
(Application filed Sept. 30, 1901.)
(No Model.) 4 Sheets—Sheet 1.
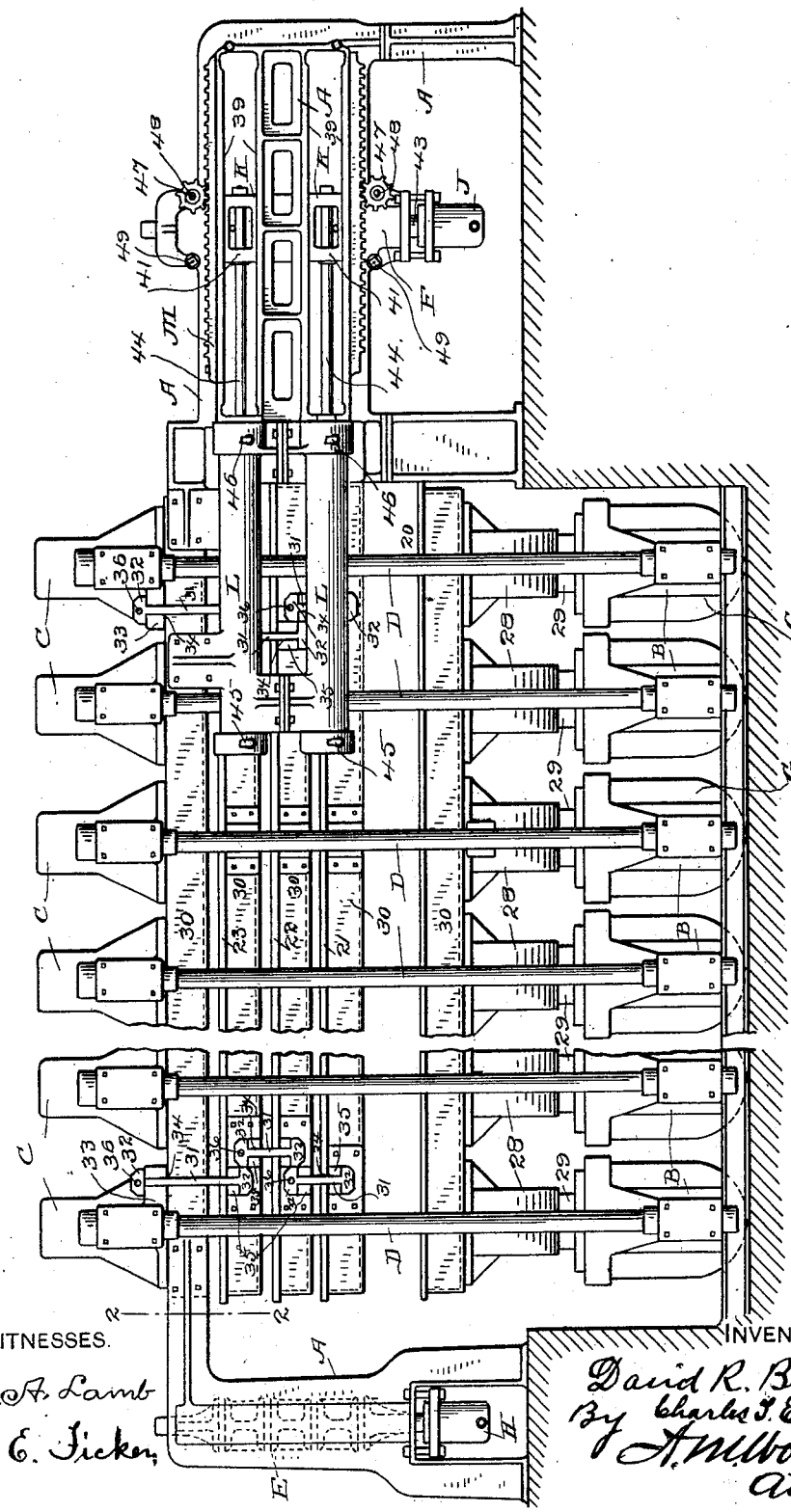

No. 694,087. Patented Feb. 25, 1902.
D. R. BOWEN & C. T. ERICSSON.
APPARATUS FOR STRETCHING AND VULCANIZING A PLURALITY OF RUBBER BELTS.
(Application filed Sept. 30, 1901.)
(No Model.) 4 Sheets—Sheet 2.
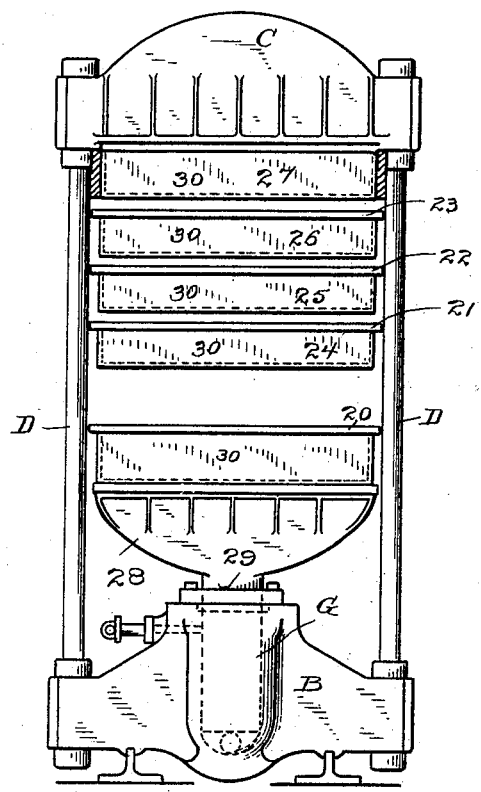
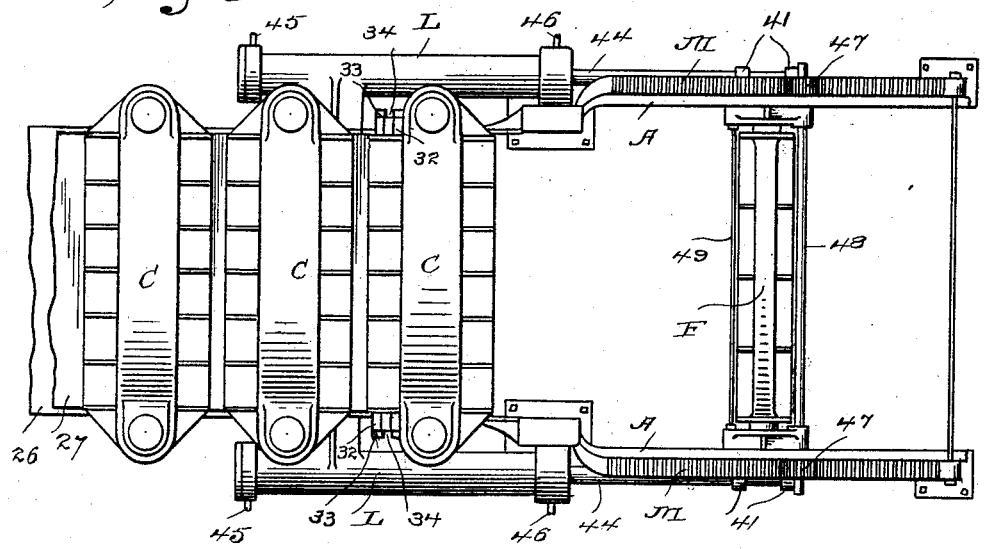
WITNESSES. INVENTORS No. 694,087. Patented Feb. 25, 1902.
D. R. BOWEN & C. T. ERICSSON.
APPARATUS FOR STRETCHING AND VULCANIZING A PLURALITY OF RUBBER BELTS.
(Application filed Sept. 30, 1901.)
(No Model.) 4 Sheets—Sheet 3.
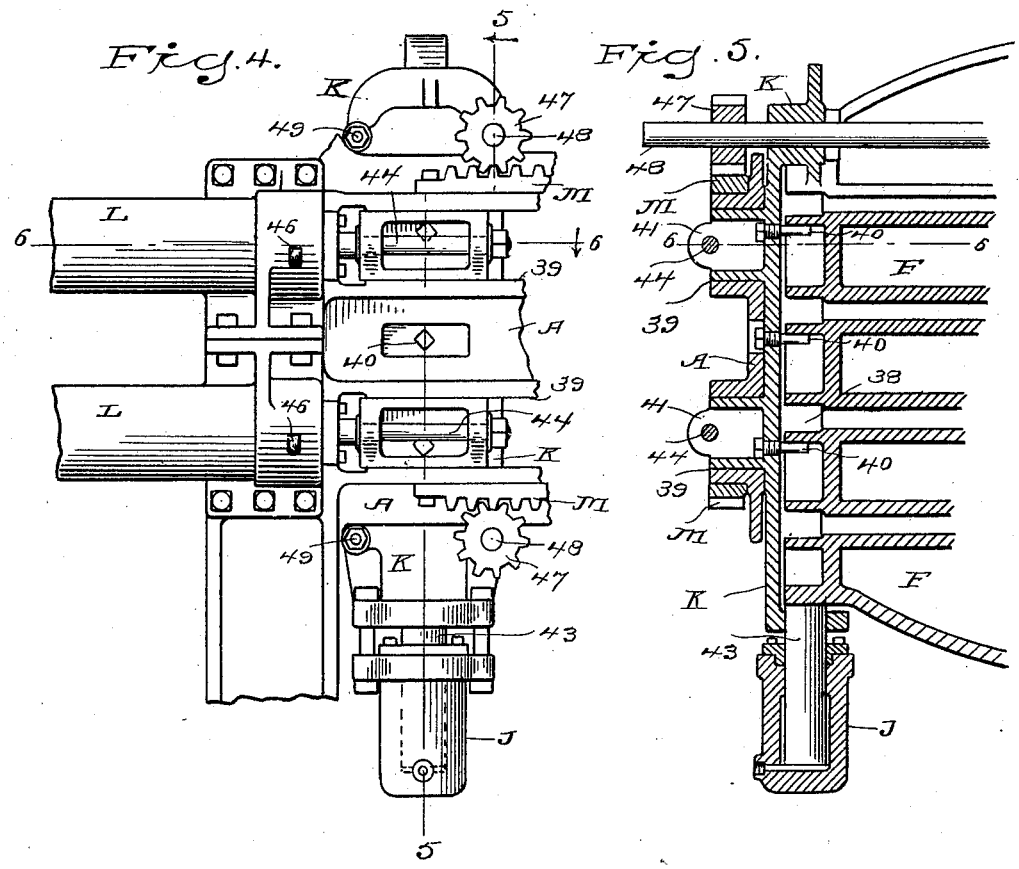
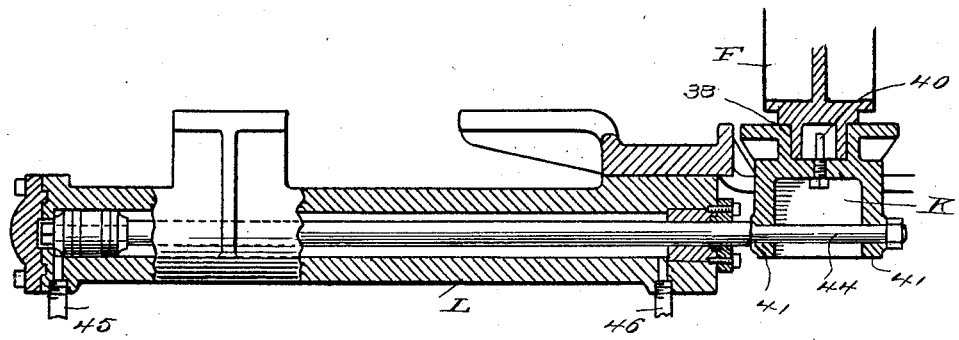
WITNESSES.
INVENTORS No. 694,087. Patented Feb. 25, 1902.
D. R. BOWEN & C. T. ERICSSON.
APPARATUS FOR STRETCHING AND VULCANIZING A PLURALITY OF RUBBER BELTS.
(Application filed Sept. 30, 1901.)
(No Model.) 4 Sheets—Sheet 4.
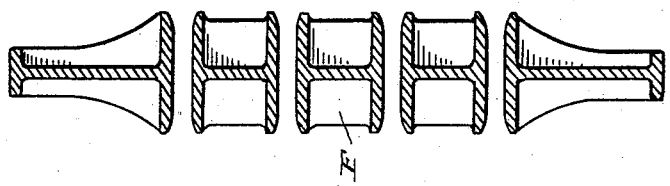
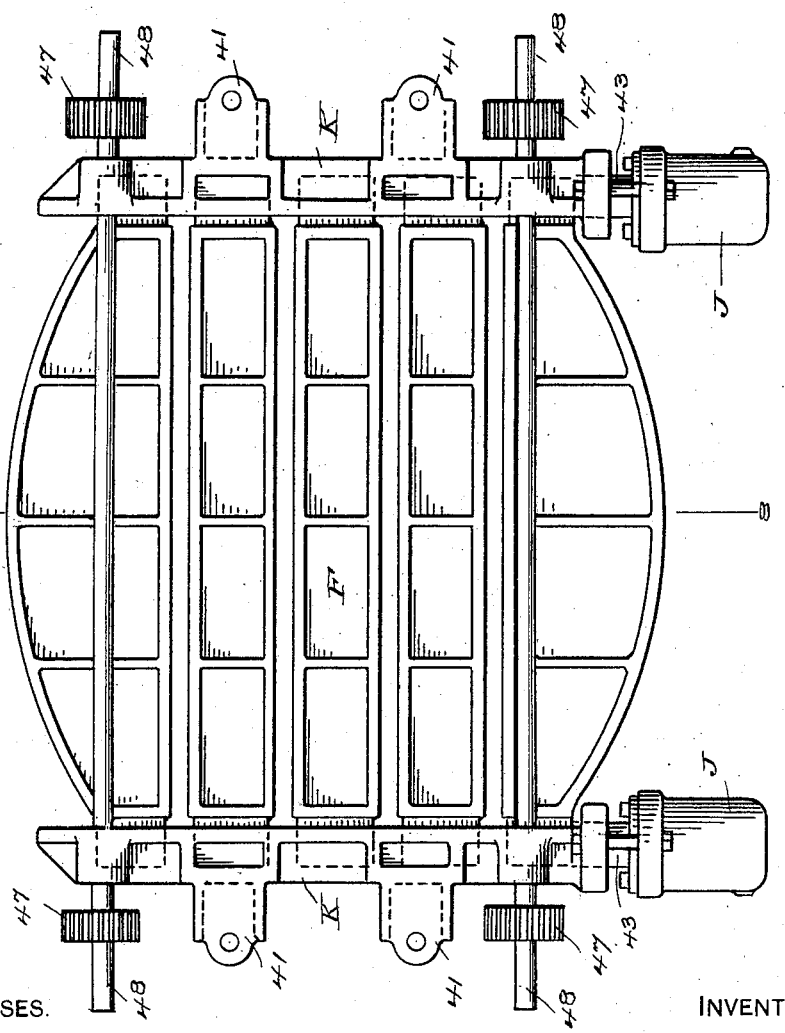
WITNESSES. INVENTORS

UNITED STATES PATENT OFFICE.

DAVID R. BOWEN AND CHARLES T. ERICSSON, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

APPARATUS FOR STRETCHING AND VULCANIZING A PLURALITY OF RUBBER BELTS.

SPECIFICATION forming part of Letters Patent No. 694,087, dated February 25, 1902.

Application filed September 30, 1901. Serial No. 77,001. (No model.)

*To all whom it may concern:*

Be it known that we, DAVID R. BOWEN and CHARLES T. ERICSSON, citizens of the United States, residing at Ansonia, county of New Haven, State of Connecticut, have invented a new and useful Apparatus for Stretching and Vulcanizing a Plurality of Rubber Belts, of which the following is a specification.

Our invention relates to the manufacture of rubber belting, and has for its object to provide simple and quick-acting hydraulically-operated apparatus for clamping, stretching, and vulcanizing a plurality of rubber belts simultaneously and for returning the sliding clamps to the starting position after each vulcanizing operation.

With these ends in view we have devised the novel hydraulic gripping and stretching apparatus which we will now describe, referring to the accompanying drawings, forming part of this specification, and using reference characters to designate the several parts.

Figure 1 is a side elevation of our novel apparatus, broken away at the center to indicate that the machine may be of any desired length, depending upon the requirements in view, the sliding clamps being moved outward, as in stretching a series of belts; Fig. 2, an end elevation as seen from the left in Fig. 1, the framework of the stationary clamps being in section on the line 2 2; Fig. 3, a plan view of the right end of the machine as seen in Fig. 1; Fig. 4, a detail side elevation, on an enlarged scale, illustrating the stretching mechanism, the sliding clamps being at the starting position; Fig. 5, a vertical section on the line 5 5 in Fig. 4; Fig. 6, a horizontal section on the line 6 6 in Figs. 4 and 5; Fig. 7, an elevation of the sliding clamps and the carrier attached, and Fig. 8 is a section on the line 8 8 in Fig. 7.

A denotes the framework, which may be of any required construction; B, lower cross-pieces; C, upper cross-pieces; D, tie-rods connecting the cross-pieces; 20, 21, 22, and 23, vulcanizing-tables; 24, 25, 26, and 27, the corresponding platens; E, the stationary clamps, and F the sliding clamps.

It will be readily understood from the drawings that the vulcanizing tables and platens are placed one above the other and are suspended in such a manner that each will pick up and carry the one above it as it moves upward. The upper platen is rigidly secured to the upper cross-pieces C, and the lower table rests upon cross-heads 28, carried by the plungers 29 of a series of hydraulic rams G.

Platens 24, 25, and 26 are formed integral with tables 21, 22, and 23, respectively. The lower table and the upper platen are provided with steam-chests, and each intermediate combined table and platen is provided with a steam-chest. As the construction of the steam-chests and the steam connections is not of the essence of our invention, we have not deemed it necessary to illustrate them in the drawings. The steam-chests appear in dotted lines only and are indicated by 30 in Figs. 1 and 2. It is of course necessary that the intermediate combined tables and platens be suspended in such a manner that their downward movement is limited and they are left free to move upward when rams G are operated. This result may be accomplished in various ways. We have shown the intermediate tables and platens as suspended by means of rods 31, having heads 32 at both ends. Certain of the upper cross-pieces C are provided with blocks 33, upon which heads 32 rest, and with recesses 34 to receive rods 31, as clearly shown in Figs. 1 and 3. The combined table and platen next below the upper cross-pieces is provided with corresponding blocks 35, under which the lower heads of rods 31 engage and which are provided with recesses 34 to receive the lower ends of the rods. The second combined table and platen is suspended in like manner from the upper combined table and platen, and the third combined table and platen is suspended in like manner from the second. In the drawings we have illustrated a machine constructed to vulcanize four or any less number of belts simultaneously. By increasing the number of intermediate combined tables and platens the number of belts that can be operated upon simultanously may be correspondingly increased. The upper heads of rods 31 may be retained in place in any convenient manner, as by pins or rivets 36, as shown in Fig. 1.

The stationary clamps E are placed one above the other, as shown in Fig. 1, and are operated by hydraulic rams H on opposite sides of the machine, (one only appearing in the drawings,) and the sliding clamps F are placed in the same manner and are operated vertically by two hydraulic rams J. (See Fig. 7.) As the construction of the stationary and sliding clamps is the same, we will describe the latter only in detail and in connection therewith will describe the apparatus for producing the sliding movement. The opposite ends of clamps F engage and are adapted to move vertically in ways 38 in a carrier K, the downward movement of each clamp being limited by engagement of the ends thereof with pins 40, extending inward from the carrier. (See Figs. 5 and 6.) It will of course be understood that the special shape of the carrier is not of the essence of our invention, it being simply required that it be so constructed as to slide freely in the opposite sides of the framework. We have shown the parts of the carrier on opposite sides of the machine as connected together by heavy transverse rods 49 and as provided with lateral extensions 41, which rest and are adapted to slide in ways 39 in the framework. In use the plungers 43 of hydraulic rams J engage the lower clamp F and raise it, each clamp or the belt resting thereon picking up and carrying upward the clamp above it, as will be more fully explained. L denotes a fourth set of hydraulic rams comprising, preferably, as shown in the drawings, two rams on each side of the framework, by which the carrier and with it clamps F are moved longitudinally of the framework. The plungers of rams L are extended to form rods 44, (or, if preferred, said rods may be attached to the plungers,) which are rigidly connected to lateral extensions 41 of the carrier, so that movement of the plungers of the rams will move the carrier, and with it clamps F, in ways 39. It will be noted that we provide each end of the cylinders of rams L with water connections 45 and 46, respectively, said connections being adapted to act alternately as induction and eduction pipes—as, for example, in stretching a series of belts water will be introduced at pipes 45 at the left end of the cylinders of rams L, pipes 46 serving as eduction-pipes, and when it is desired to return the carrier and clamps F to the starting position, as in Fig. 4, connections 46 become the induction-pipes and connections 45 the eduction-pipes, as will be more fully explained. Our special object in providing two rams on each side of the framework to move the carrier is to insure the most perfect steadiness of operation under all circumstances. As an additional means of insuring steadiness of operation we preferably provide racks M upon the top and bottom of the framework on each side of the machine. These racks are engaged by pinions 47 upon the carriers, in the present instance shown as fixed to transverse shafts 48. We find in practice that perfect smoothness and positiveness of movement are insured by the special construction of the carrier in connection with the use of two rams on each side of the machine and the use of the pinions and racks.

The operation of the machine as a whole is as follows: In starting, the tables and platens and the stationary clamps are open, substantially as in Fig. 1, the sliding clamps are open, as in Fig. 7, and the carrier and said clamps are moved to the extreme of their movement toward the left, as in Fig. 4. The series of belts, four or less, are passed into the machine from the left, as seen in Fig. 1, between the stationary clamps. Then each belt is carried forward between a table and a platen, and an end of each belt is placed between two of the sliding clamps F. Rams J are then operated, and clamps F are moved upward, each clamp being engaged by the belt carried by the clamp below it until each belt in the series is firmly gripped by said clamps. Having caused clamps F to grip the series of belts firmly, clamps E are then operated in precisely the same manner by means of rams H, the lower clamp being first raised and each clamp being picked up and carried upward by the belt resting on the clamp below it until all of the belts are rigidly gripped between them. Having gripped the free ends of the belts by clamps F and again gripped the belts at the opposite ends of the vulcanizing tables and platens by hydraulic pressure, the next step is the stretching of the belts, which is performed by the four rams L acting upon the carrier K, upon which clamps F are mounted. At the commencement of the stretching operation the carrier is in the position shown in Fig. 4, the water connections 46, appearing in said figure, serving as eduction-pipes, and connections 45 at the other end of the cylinders of said rams L serving as induction-pipes. The operation of stretching is thus performed hydraulically, the amount of stretching to be given to the belts being a matter wholly within the judgment of the manufacturer. Having completed the stretching operation, the next operation is pressing and vulcanizing the series of belts. The pressing operation is effected by means of rams G. The plungers of these rams carry cross-heads 28, upon which the lower table and steam-chest rest, the next combined table and platen above being picked up by the lower table (or the belt resting thereon) in its upward movement and each combined table and platen being picked up by the one below it until each belt in the series is subjected to pressure between a table and a platen, the amount of pressure upon the belts being another matter wholly within the judgment of the manufacturer. While the belts are being pressed between the tables and the platens steam is admitted to the several steam-chests 30 for the purpose of vulcanizing or curing the belts.

When the vulcanizing operation is completed, the pressure of the tables and the platens is relieved through the operation of rams G, and the pressure of clamps E and F is relieved through the operation of rams H and J. The carriers, with clamps F, are then moved from approximately the position shown in Figs. 1 and 3 to the position shown in Fig. 4 by operating rams L in the opposite direction, connections 46 being now the induction-pipes and connections 45 the eduction-pipes. This double hydraulic action of the rams which operate the carrier is a matter of considerable importance and saves much time, owing to the great relative movement of the carrier. Having returned the carrier and clamps F to the normal position, as in Fig. 4, the operation of curing another section of each of the belts simultaneously is proceeded with. The belts are drawn forward toward the right between the two sets of clamps and the tables and platens until the portion of the belts already cured is entirely out from between the tables and the platens, and said tables and platens will just grip uncured belting, taking care, of course, to leave no uncured portions between the several lengths as they are cured. Having drawn the belts forward until the cured or vulcanized portion has passed the tables and platens, clamps F are then operated as before by means of rams J. Then clamps E are operated again by means of rams H. Then the stretching operation is performed by means of rams L, and finally the tables and the platens are elevated to press the belts by means of rams G, after which another section of the belts is vulcanized or cured as before, these operations being repeated in the manner described upon sections of a series of belts simultaneously until the belts are all cured, after which new pieces of belting may be inserted and operated upon in the same manner.

Having thus described our invention, we claim—

1. The combination with a series of vulcanizing tables and platens and means for operating said tables and platens hydraulically to press a series of belts simultaneously, of series of clamps at the opposite ends of the tables and platens, hydraulic rams for operating said clamps to grip a series of belts simultaneously at two places and means for moving one series of clamps longitudinally of the machine so as to stretch the series of belts simultaneously.

2. The combination with a series of vulcanizing tables and platens and means for operating said tables and platens hydraulically to press a series of belts simultaneously, of a series of clamps at the opposite ends of the tables and platens, means for operating said clamps to grip a series of belts simultaneously and double-acting hydraulic rams on opposite sides of the machine for moving one series of clamps longitudinally of the machine in either direction so as to stretch a series of belts simultaneously or to return the clamps to the starting position.

3. The combination with a series of vulcanizing tables and platens and means for operating said tables and platens hydraulically to press a series of belts simultaneously, of a series of clamps at the opposite ends of the tables and platens, hydraulic rams for operating said clamps to grip a series of belts simultaneously at two places and double-acting hydraulic rams on opposite sides of the machine for moving one series of clamps longitudinally of the machine in either direction, substantially as shown for the purpose specified.

4. The combination with a series of vulcanizing tables and platens and means for operating said tables and platens hydraulically to press a series of belts simultaneously, of a series of stationary clamps, hydraulic rams for operating said clamps to grip a series of belts simultaneously, a sliding carrier, a series of clamps carried thereby, hydraulic rams moving with the carrier to operate said clamps and other hydraulic rams adapted to move the carrier longitudinally of the machine to stretch a series of belts simultaneously.

5. The combination with a series of vulcanizing tables and platens and means for operating said tables and platens hydraulically to press a series of belts simultaneously, of a series of stationary clamps, hydraulic rams for operating said clamps, a series of sliding clamps, a carrier for said clamps, hydraulic rams for operating the sliding clamps and hydraulic rams for operating the carrier in either direction.

6. The combination with a series of vulcanizing tables and platens and a series of hydraulic rams for operating said tables and platens, of a series of stationary clamps, hydraulic rams for operating said clamps, a series of sliding clamps, a carrier for the sliding clamps, hydraulic rams upon the carrier for operating said clamps and hydraulic rams for moving the carrier longitudinally upon the machine.

7. In a machine of the character described, the combination with an upper platen, a lower table and a series of intermediate combined tables and platens, of hydraulic rams to operate said tables and platens to press a series of belts simultaneously and means for suspending the intermediate combined tables and platens, whereby the downward movement is limited and they are left free to be moved upward by the rams.

8. In a machine of the character described the combination with an upper platen and a lower table, of a series of intermediate combined tables and platens, double-headed rods 31 and blocks upon said tables and platens which are adapted to be engaged by the heads and are provided with recesses to receive the bolts, so that the downward movement of the intermediate tables and platens is limited, but they are left free to move upward, substantially as shown for the purpose specified.

9. In a machine of the character described, the combination with means for pressing and vulcanizing a series of belts simultaneously, of a series of stationary clamps, a series of sliding clamps, hydraulic rams for operating said clamps and means for suspending the intermediate clamps, whereby, their downward movement is limited and they are left free to be moved upward by the rams.

10. The combination with a series of vulcanizing tables and platens and hydraulic rams for operating said tables and platens to press and vulcanize a series of belts simultaneously, of series of stationary and sliding clamps, hydraulic rams for operating said clamps and pins engaging said clamps to limit their downward movement leaving them free to be moved upward by the rams.

11. The combination with a series of vulcanizing tables and platens and hydraulic rams for operating said tables and platens to press and vulcanize a series of belts simultaneously, of series of stationary and sliding clamps, hydraulic rams for operating said clamps, a carrier for the sliding clamps, hydraulic rams for operating said carrier, stationary racks and pinions upon the carrier engaging said racks, substantially as shown, for the purpose specified.

12. The combination with framework having upper and lower racks on both sides, a series of vulcanizing tables and platens and hydraulic rams for operating said tables and platens, of series of stationary and sliding clamps, hydraulic rams for operating said clamps, a carrier for the sliding clamps, pinions on said carrier engaging the racks and hydraulic rams on opposite sides of the framework for operating the carrier.

13. The combination with framework having upper and lower racks on both sides, vulcanizing tables and platens and hydraulic rams therefor, of stationary and sliding clamps, hydraulic rams for operating the clamps, a carrier for the sliding clamps having pinions engaging the racks and duplicate double-acting hydraulic rams on opposite sides of the framework for operating the carrier.

In testimony whereof we affix our signatures in presence of two witnesses.

DAVID R. BOWEN.
CHARLES T. ERICSSON.

Witnesses:
G. W. OSBORN,
EDWIN VAN RIPER.